(12) United States Patent
Xie et al.

(10) Patent No.: US 10,648,550 B2
(45) Date of Patent: May 12, 2020

(54) HARMONIC DRIVING DEVICE

(71) Applicant: INDUSTRIAL TECHNOLOGY RESEARCH INSTITUTE, Hsin-Chu (TW)

(72) Inventors: Kun-Ju Xie, Changhua County (TW); Jui-Tang Tseng, Hsinchu (TW); Ching-Huei Wu, Zhubei (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 376 days.

(21) Appl. No.: 15/586,689

(22) Filed: May 4, 2017

(65) Prior Publication Data
US 2018/0187763 A1 Jul. 5, 2018

(30) Foreign Application Priority Data

Dec. 29, 2016 (TW) .............................. 105143953 A (51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................... F16H 49/001; F16H 2049/003
USPC ............................................................ 74/640
See application file for complete search history.

(56) References Cited

U.S. PATENT DOCUMENTS

| | | | |
|---|---|---|---|
| 2,906,143 A * | 9/1959 | Walton .................. | F16H 49/001 74/640 |
| 5,269,202 A | 12/1993 | Kiyosawa et al. | |
| 5,720,101 A | 2/1998 | Foley et al. | |
| 5,782,143 A * | 7/1998 | Ishikawa ............. | F16H 55/0833 74/640 |
| 7,694,607 B2 | 4/2010 | Ishikawa et al. | |
| 7,735,396 B2 | 6/2010 | Ishikawa et al. | |
| 8,302,507 B2 | 11/2012 | Kanai | |
| 8,646,360 B2 | 2/2014 | Kanai | |
| 8,661,940 B2 | 3/2014 | Ishikawa | |
| 9,360,098 B2 * | 6/2016 | Roopnarine .......... | F16H 49/001 |
| 9,494,223 B2 * | 11/2016 | Jensen .................. | F16H 49/001 |
| 9,709,151 B2 * | 7/2017 | Kurogi .................. | F16H 49/001 |
| 9,897,189 B2 * | 2/2018 | Liang .................... | F16H 49/001 |
| 2008/0060473 A1 | 3/2008 | Li | |
| 2013/0312558 A1 | 11/2013 | Kanai | |
| 2014/0165758 A1 | 6/2014 | Moune et al. | |

FOREIGN PATENT DOCUMENTS

| | | |
|---|---|---|
| CN | 2481905 Y | 3/2002 |
| CN | 102817969 A | 12/2012 |

(Continued)

OTHER PUBLICATIONS

Intellectual Property Office Ministry of Economic Affairs, R.O.C., "Office Action", dated Jul. 28, 2017, Taiwan.

(Continued)

*Primary Examiner* — Ha Dinh Ho (74) *Attorney, Agent, or Firm* — Locke Lord LLP; Tim Tingkang Xia, Esq.

(57) ABSTRACT

A harmonic driving device comprises a wave generator, a rigid wheel having an internal gear furnished therein, and a flexible wheel having an external gear furnished therein further comprising a cup-shaped which is composed of a main body and a bottom, a plurality of holes are disposed on the cup-shaped.

19 Claims, 9 Drawing Sheets

(56) References Cited

FOREIGN PATENT DOCUMENTS

| | | |
|---|---|---|
| CN | 104919221 A | 9/2015 |
| JP | 60084440 | 5/1985 |
| JP | H02283941 A | 11/1990 |
| KR | 20120045779 A | 5/2012 |
| TW | 331384 U | 5/1998 |
| TW | M440257 U | 11/2012 |
| TW | M441059 U | 11/2012 |
| TW | 201425776 A | 7/2014 |
| TW | I487858 B | 6/2015 |
| TW | M528385 U | 9/2016 |

OTHER PUBLICATIONS

Japan Patent Office, "Office Action", dated Jul. 31, 2018.

Tegoeh Tjahjowidodo et al., Characterization of Torsional Stiffness in Harmonic Drive, 24th Benelux Meeting on Systems and Control, 2006, Book of Abstracts.

P. Folega, Determination of Torsional Stiffness of Harmonic Drive, Zeszyty Naukowe Politechniki Slaskiej, 2014, Seria: Transport z. 83.

P. Folega et al., Numerical Analysis of Selected Materials for Flexsplines, Archives of Metallurgy and Materials, 2012, vol. 57, Issue 1.

Kai Fu et al., Research on the effects of geometrical parameter of flexspline on harmonic reducer, 5th International Conference on Advanced Design and Manufacturing Engineering, 2015.

Sandeep Awasthi et al., Stress Deformation & Stiffness Analysis of Two Materials (Steel and Glass / Epoxy) of Flexspline Using ANSYS, International Journal of Scientific Research Engineering & Technology, 2014, vol. 3, Issue 3.

W. Ostapski et al., Stress state analysis of harmonic drive elements by FEM, Bulletin of the Polish Academy of Sciences, Technical Sciences, 2007, vol. 55, No. 1.

China Patent Office, "Office Action", dated Jan. 15, 2020, China.

\* cited by examiner

HARMONIC DRIVING DEVICE

CROSS REFERENCE TO RELATED APPLICATION

This application also claims priority to Taiwan Patent Application No. 105143953 filed in the Taiwan Patent Office on Dec. 29, 2016, the entire content of which is incorporated herein by reference.

TECHNICAL FIELD

The present disclosure relates to a harmonic driving technique, and more particularly, to a harmonic driving device having a cup-shaped with a plurality of holes to be furnished on its flexible wheel.

BACKGROUND

Generally, a harmonic driving device is a mechanical reduction mechanism, that is preferred comparing with the conventional gear transmission device by its compactness and light weight. Since the harmonic driving device can have wider transmission ratio range, i.e. the single-stage transmission ratio is ranged between 60~320, and the multi-stage transmission ratio is ranged between 1600~100000, it is further being preferred by its high transmission efficiency, high transmission precision and high bearing capacity and thus can be used in various industrial applications. It is noted that the harmonic driving device is commonly used in the field of high reduction ratio.

A conventional harmonic driving device is mainly composed of a wave generator, a flexible wheel and a rigid wheel. The wave generator is an oval-shaped device with a long axis and a short axis and is generally connected to a power input shaft. The flexible wheel is a flexible shallow cup with external gear that are positioned radially around the outside of the cup, and the cup is generally composed of a thin cylinder-shaped main body and a bottom that are integrally furnished, while being connected to a power output shaft by the bottom thereof. The rigid wheel is a rigid circular with internal gear on the inside. Operationally, the flexible wheel fits tightly over the wave generator, while allowing the flexible wheel to be placed inside the rigid wheel and enabling the external gear to mesh with the internal gear.

Figure 11:
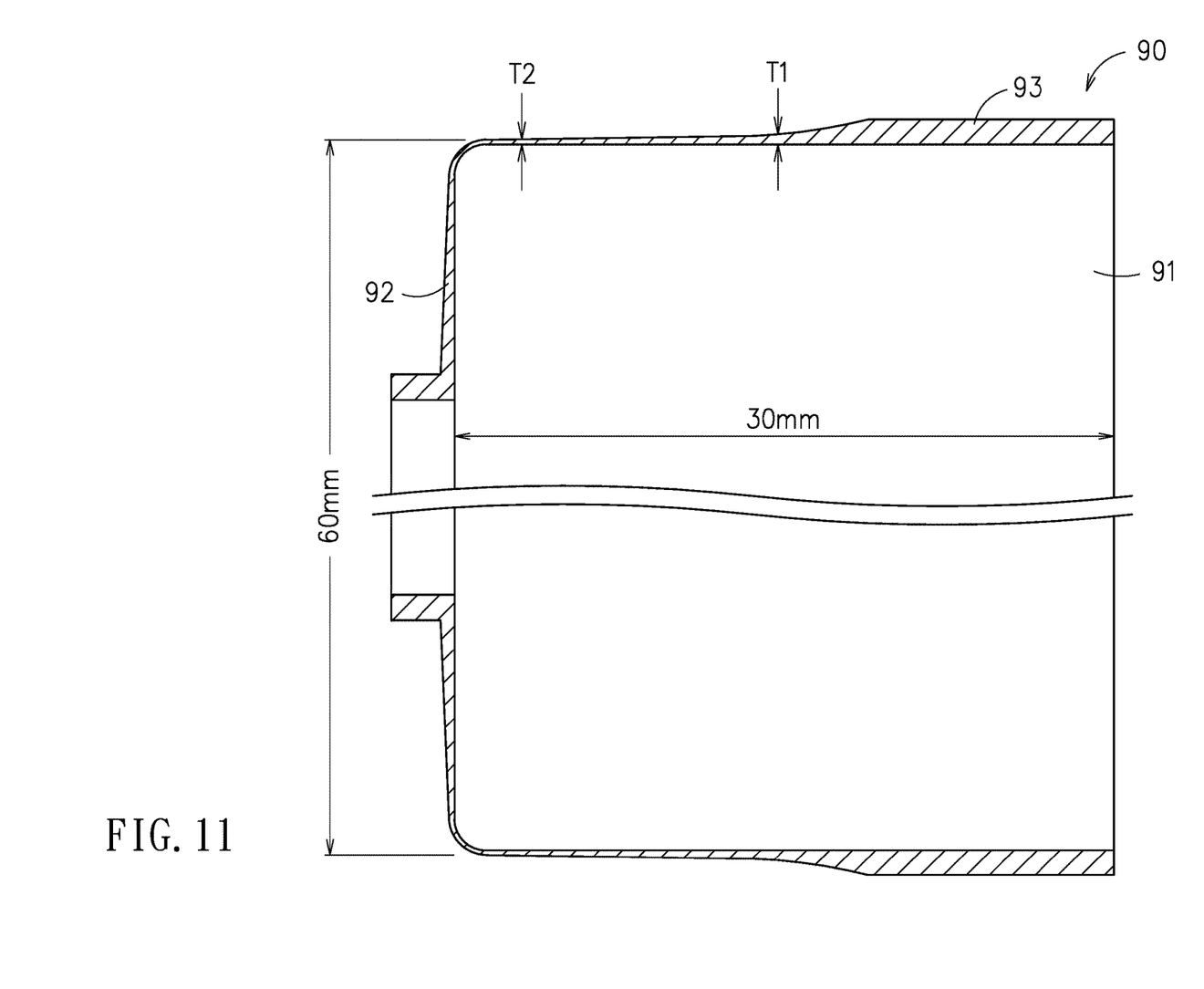
FIG. 11 is a partial sectional view of a conventional flexible wheel.

It is noted that the main body of the flexible wheel is designed with non-uniform thickness. As shown in FIG. 11, following the extending of the flexible wheel 90 from the external gear 93 to the bottom 92, the thickness of the main body 91 is tapered from the first thickness T1 to the second thickness T2. In an embodiment, when the first thickness T1 can be 0.4 mm, the tapering in thickness can reduce the second thickness T2 to 0.3 mm. However, as the harmonic driving device is designed to operate as a high-precision mechanical transmission shifting mechanism, such non-uniform thickness design can lead to high manufacture difficulty and poor production stability, and thus further adversely affect the power transmitted form the output shaft. Moreover, since the main body 91 of the flexible wheel 90 is furnished as a closed cup, its heat dissipation ability is poor and thus can cause its geometry to be deformed by the increasing temperature.

Therefore, it is important to have an improved harmonic driving device, which is designed for allowing its stiffness to be adjusted flexibly, and is able to eliminate vibration and noise while capable of solving the problem of uneven stress distribution on its flexible wheel.

SUMMARY

In an embodiment, the present disclosure provides a harmonic driving device, which comprises: a wave generator; a rigid wheel, having an internal gear furnished therein; and a flexible wheel, having an external gear furnished thereon, and further having a cup-shaped that is composed of a main body and a bottom; wherein, the cup-shaped further has a plurality of hole furnished thereon.

In another embodiment, the present disclosure further provides a harmonic driving device, which comprises: a wave generator; a rigid wheel, having an internal gear furnished therein; a flexible wheel, having an external gear furnished thereon, and further having a cup-shaped with a plurality of holes, while enabling the cup-shaped to be composed of a main body and a bottom; a first drive shaft, connected to the wave generator; and a second drive shaft, connected to the bottom of the flexible wheel; wherein, the rigid wheel is fixedly stationed at a specific position, while allowing one shaft selected from the first drive shaft and the second drive shaft to be used as a power input shaft and the other to be used as a power output shaft.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 8A to FIG. 10B are diagrams showing the comparisons between a conventional flexible wheel and various flexible wheels used in different embodiments of the present disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
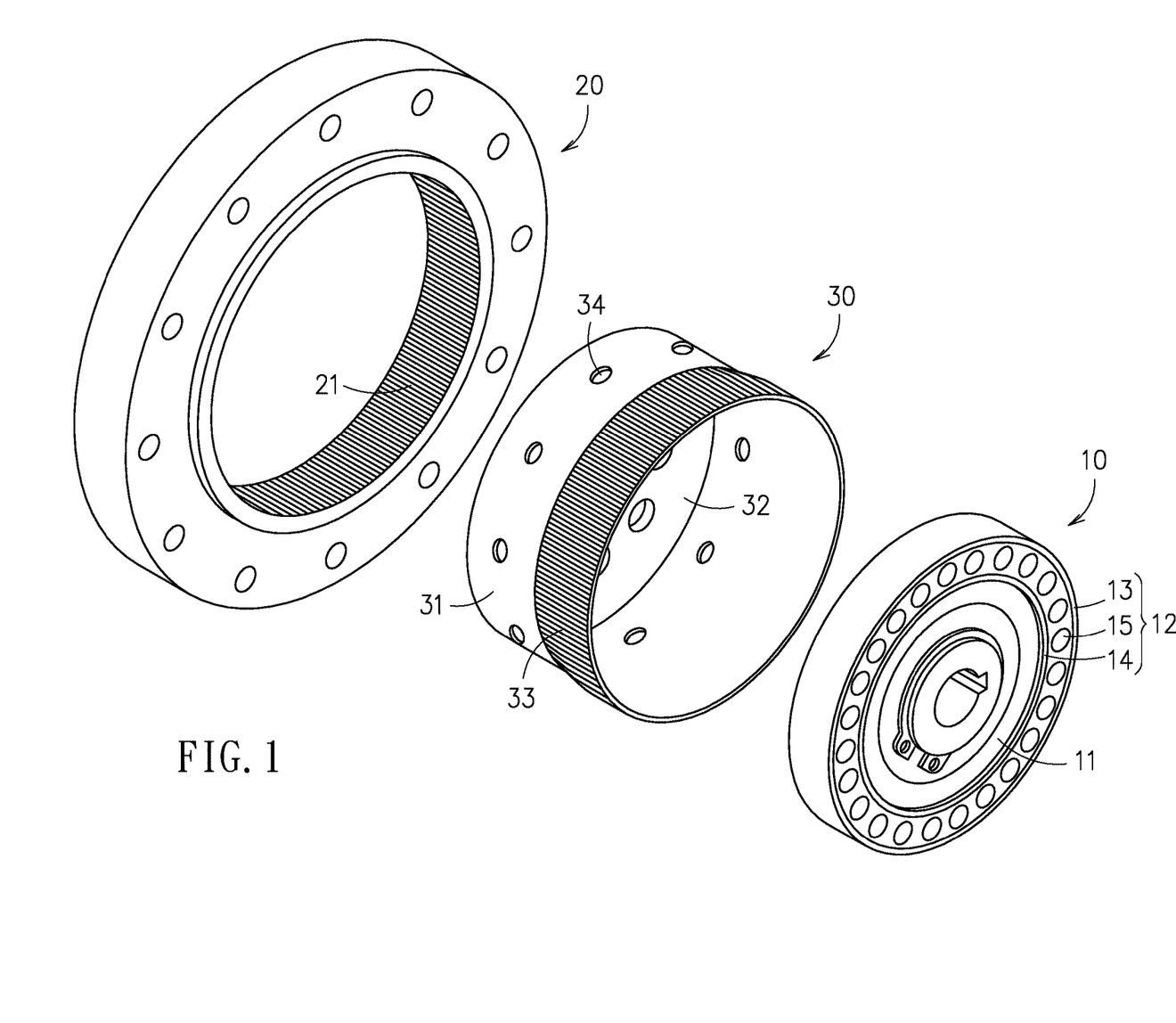
FIG. 1 is an exploded view of a harmonic driving device according to an embodiment of the present disclosure.
Figure 2:
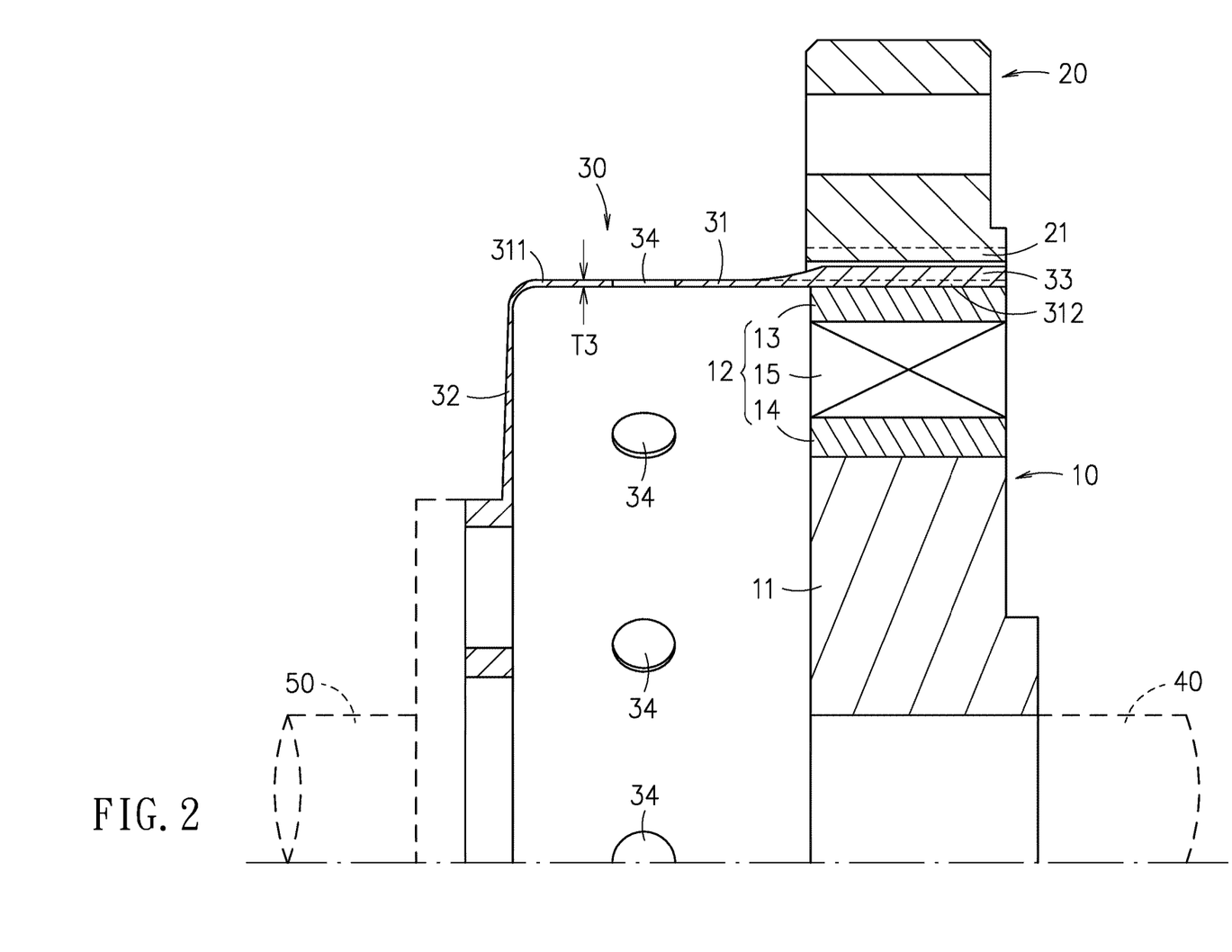
FIG. 2 is a cross sectional view of a harmonic driving device according to an embodiment of the present disclosure.

Please refer to FIG. 1 and FIG. 2, which show a harmonic driving device according to an embodiment of the present disclosure. In FIG. 1 and FIG. 2, the harmonic driving device comprises: a wave generator 10, a rigid wheel 20 and a flexible wheel 30.

As shown in FIG. 1 and FIG. 2, the wave generator 10 is composed of a cam 11 and a bearing module 12. In an embodiment, the cam 11 is substantially an oval-shaped cam, and the bearing module 12 is further composed of an outer ring 13, an inner ring 14 and a ball bearing 15, in which the inner ring 14 is arranged surrounding the periphery of the cam 11, the ball bearing 15 is arranged surrounding the periphery of the inner ring 14, and the outer ring 13 is further arranged surrounding the periphery of the ball bearing 15. In this embodiment, the outer ring 13 and the inner ring 14 are originally furnished as circular rings before being assembled, whereas they are stretched and deformed into oval-shaped rings after being fitted to the oval-shaped cam 11 and forced to conform to the profile of the cam 11. Thereby, the wave generator 10 is also an oval-shaped device.

As shown in FIG. 1 and FIG. 2, the rigid wheel 20 is a circular ring which is furnished with an internal gear 21, while each tooth of the internal gear can be an involute rack tooth or a barreled tooth. In this embodiment, the teeth in the internal gear 21 are barreled teeth. It is noted that the rigid wheel 20 is fixedly stationed at a specific position, that is, the rigid wheel 20 can be fixed to a machine bench or to a frame of a power unit. The wave generator 10 is connected to a first drive shaft 40, and the flexible wheel 30 is connected to a second drive shaft 50. In an embodiment, the first drive shaft 40 is used as an input shaft, while the second drive shaft 50 is used as an output shaft. Nevertheless, in another embodiment, the first drive shaft 40 is used as an output shaft, while the second drive shaft 50 is used as an input shaft.

Figure 3:
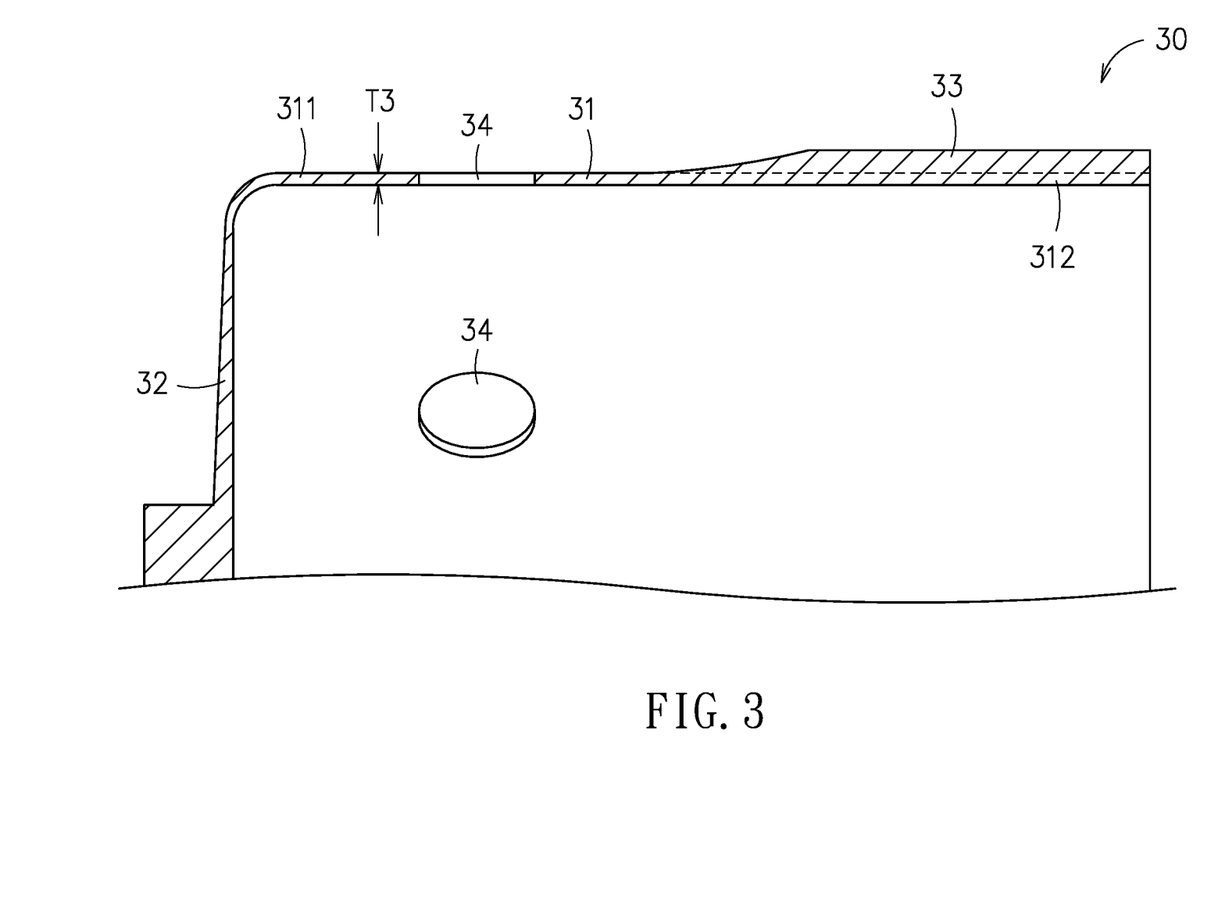
FIG. 3 is a partial sectional view of a flexible wheel used in a harmonic driving device of the present disclosure.

As the embodiment shown in FIG. 1~FIG. 3, the flexible wheel 30 is a flexible shallow cup-shaped with external gear that are positioned radially around the outside of the cup-shaped and the cup-shaped and is generally composed of a thin cylinder-shaped main body 31 and a bottom 32. In addition, the main body 31 has a first end 311 and a second end 312 that are disposed opposite to each other in the axial direction of the main body 31. Moreover, the first end 311 of the main body 30 is furnished with one and the same thickness T3, whereas the thickness T3 maintained to be uniform within a range between the first end 311 to the second end 312, while allowing the second end 312 to be furnished with a thickness larger than the thickness T3 of the first end 311. In this embodiment, the first end 311 of the main body 30 is connected to the bottom 32, while allowing the external gear 33 to be disposed surrounding the periphery of the second end 312. Generally, the tooth of the external gear 33 can be an involute rack tooth or a barreled tooth, and in this embodiment, each tooth of the external gear 33 is a barreled tooth. The amount of teeth on the external gear 33 is different from those of the internal gear 21, i.e. the internal gear 21 has more teeth than the external gear 33.

Furthermore, the flexible wheel 30 has a plurality of holes 34 furnished therein, whereas there can be no restriction to the size, shape and disposition of those holes 34. In this embodiment, the plural holes 34 are disposed on the cup-shaped of the main body 31 for forming one circle surrounding the periphery of the flexible wheel 30. In this embodiment, each of the plural holes 34 is a circular-shaped hole, but it is not limited thereby that the hole 34 can be a rectangular-shaped hole or others. It is noted that the plural holes 34 can be arranged within an area covering the main body 31 and the bottom 32.

Figure 4:
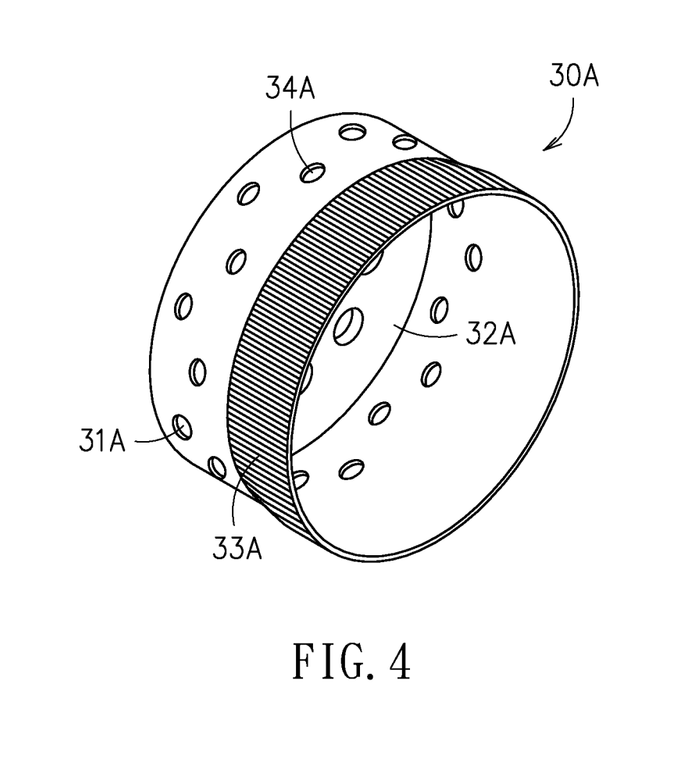
FIG. 4 and FIG. 5 are schematic diagrams showing holes that are furnished on the flexible wheel of a harmonic driving device according to different embodiments of the present disclosure.

As shown in FIG. 4, the flexible wheel 30A is a flexible shallow cup-shaped and is generally composed of a main body 31A and a bottom 32A, while allowing an external gear 33A to be furnished and positioned radially around the outside of the main body 31A. In this embodiment, the holes 34A are furnished on the main body 31A of the cup-shaped while being disposed surrounding the periphery of the flexible wheel 30A. In addition, the plural holes 34A are alternatively disposed on the cup-shaped of the flexible wheel 30A for forming two circles surrounding the flexible wheel 30A.

Figure 5:
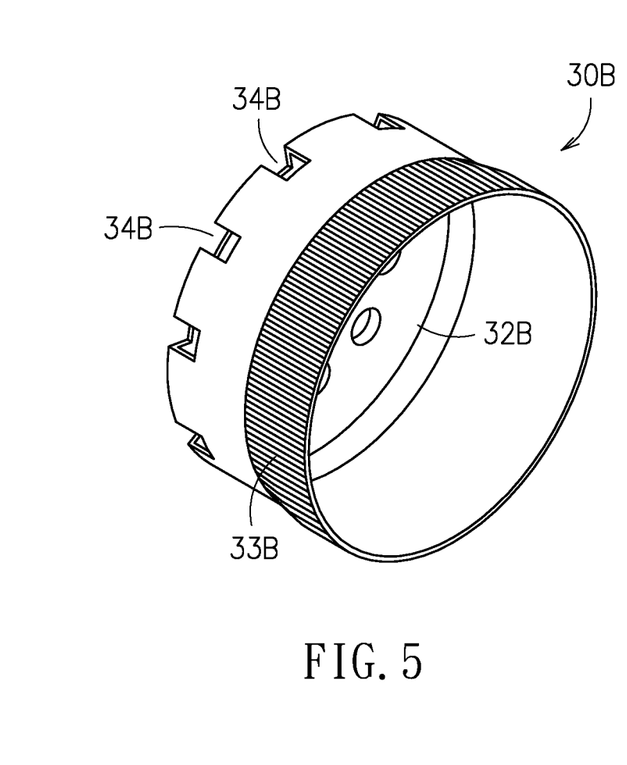

As shown in FIG. 5, the flexible wheel 30B is a flexible shallow cup-shaped and is generally composed of a main body 31B and a bottom 32B, while allowing an external gear 33B to be furnished and positioned radially around the outside of the main body 31B. In this embodiment, the plural holes 34B are disposed at the joint between the main body 31B and the bottom 32B within a rectangular area covering the main body 31B and the bottom 32B.

As shown in FIG. 1 and FIG. 2, the flexible wheel 30 is fitted tightly inside the rigid wheel 20, and the wave generator 10 is fitted inside the second end 312 of the flexible wheel. Since the wave generator 10 is an aval-shaped unit, the rotation of the wave generator 10 will force the second end 312 of the flexible wheel 30 to deform accordingly into a rotating ellipse, while enabling the external gear 33 on the long-axis of the rotating ellipse to mesh with the corresponding internal gear 21, and the external gear 33 on the short-axis of the rotating ellipse to disengage with the corresponding internal gear 21. That is, the external gear 33 is forced to mesh with a position of the internal gear 21.

Figure 6:
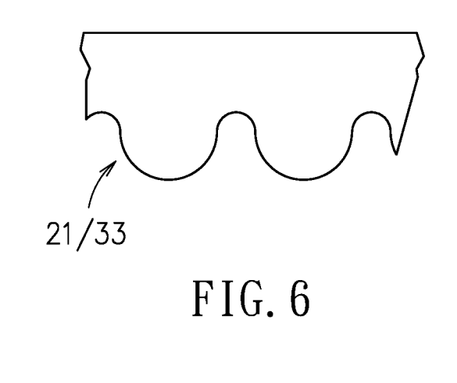
FIG. 6 and FIG. 7 are schematic diagrams showing teeth of different shapes that are used in a harmonic driving device according to different embodiments of the present disclosure.
Figure 7:
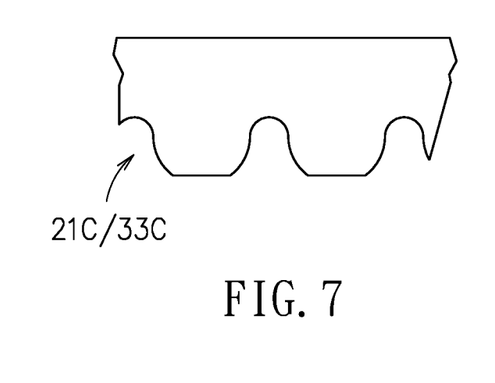

In FIG. 6, the internal gear 21 and the external gear are barreled teeth, which are the same for those shown in FIG. 7. However, each of the teeth shown in FIG. 7 is a tooth furnished with a flat top. In addition, the profile and size of those teeth are not limited by the embodiment shown in FIG. 6 and FIG. 7.

As shown in FIG. 1 to FIG. 3, when the wave generator 10 is being driven to rotate by the first drive shaft 40, the rotating wave generator 10 by bring along the flexible wheel 30 to rotate that is going to cause the main body 31 to deform accordingly by the flexibility of the main body 31. Consequently, various portions of the external gear 33 will be forced to mesh with their corresponding portions of the internal gear 21 by the deforming main body 31. The key to the design of the present disclosure is that there are fewer teeth (often for example two fewer) on the external gear 33 than there are on the internal gear 21. This means that for every full rotation of the wave generator 10, the flexible wheel 30 would be required to rotate a slight amount (two teeth in this example) backward relative to the rigid wheel 20. Thus the rotation action of the wave generator 10 results in a much slower rotation of the flexible wheel 30 in the opposite direction, and thereby, the second drive shaft 50 that is connected to the flexible wheel 30 is rotating in a speed slower that that of the first drive shaft 40. In addition, since the main body 31 is a piece independent to the bottom 32, the rotating wave generator 10 can force the external gear straightly toward the internal gear 21 without any skewing, and mesh thereto tightly and evenly while the rotating wave generator 10 brought along its cam 11 to drive the flexible wheel 30 to rotate. In this embodiment, each of the internal gear 21 and the external gear is a barreled tooth, by that the problem of local stress concentration can be avoided that the force on either internal gear 21 or the external gear are even and thus the wear and tear of the external gear 33 is minimized, and thereby, the lifespan of the harmonic driving device is prolonged. It is noted that each of the barreled teeth is furnished with a circular tooth profile.

Figure 8A:
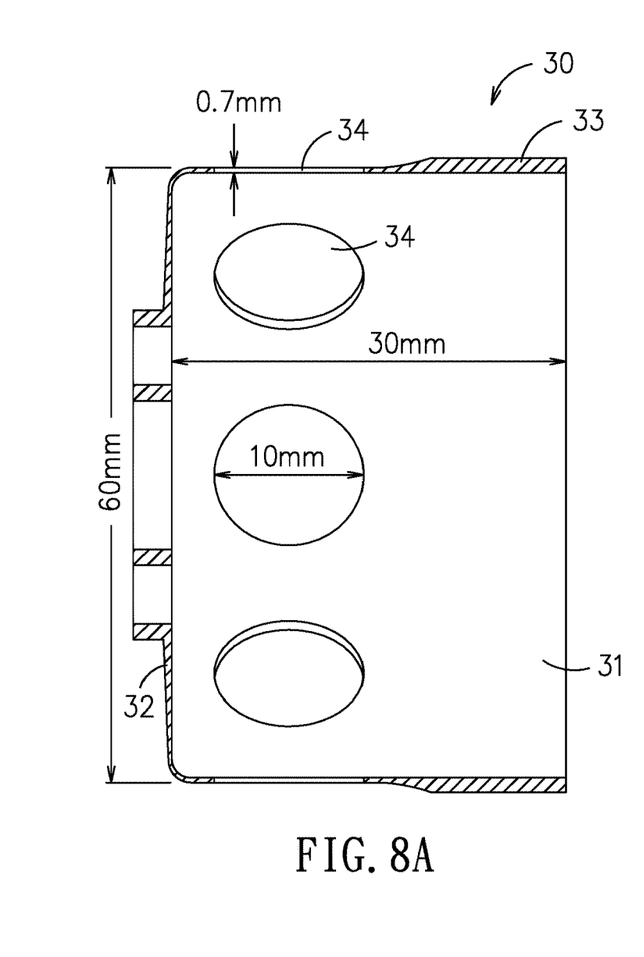
Figure 9A:
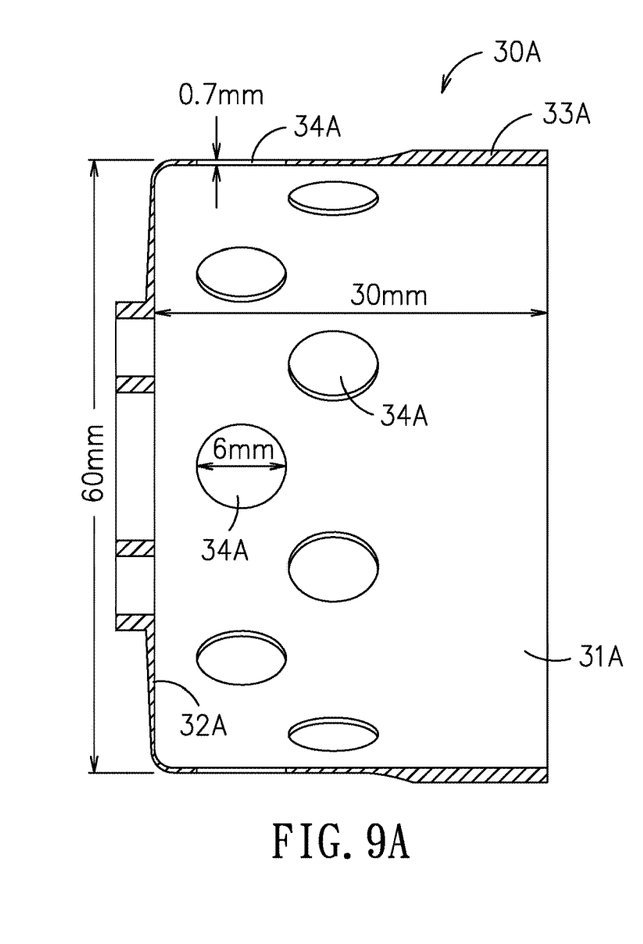

By the even thickness and holes 34 on the main body 31 of the cup-shaped, the manufacture difficulty is decreased while the production stability is increased. Moreover, the main body 31 of the present disclosure can achieve the same torsional stiffness as those conventional flexible wheels, and the induced stress can be distributed evenly for increasing the lifespan of the whole device. In addition, the heat dissipation ability is also improved by the arrangement of the plural holes 34, by that the geometrical deformation by the increasing temperature can be minimized. Please refer to FIG. 8A to FIG. 10A, which are schematic diagrams showing three embodiments of different holes arrangements. Comparing the torsional stiffness of the flexible wheel of the present disclosure with the flexible wheel designs of prior art under the same rated torque (67 NM), the stiffness of the flexible wheel of the present disclosure can be adjusted flexibly.

Figure 8B:
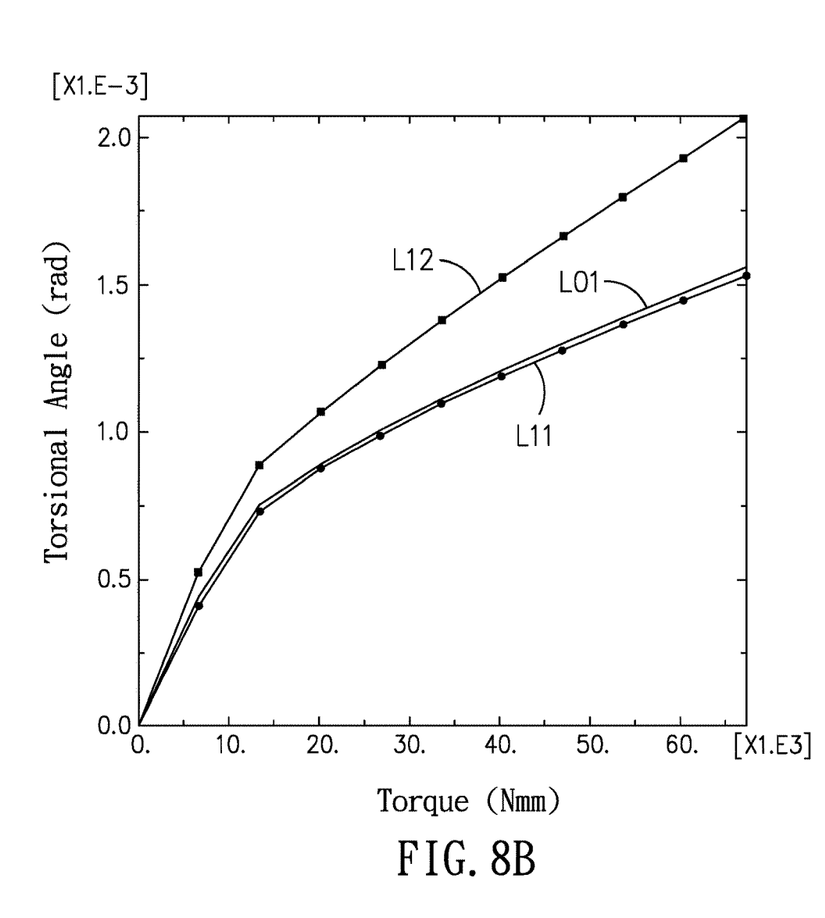
Figure 9B:
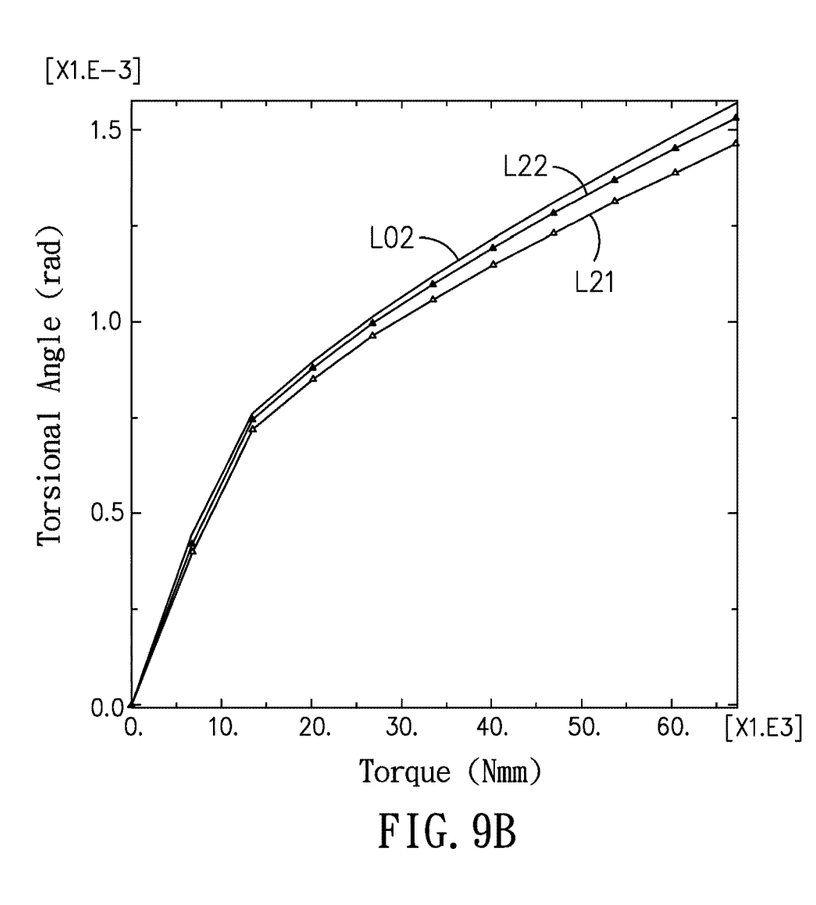
Figure 10A:
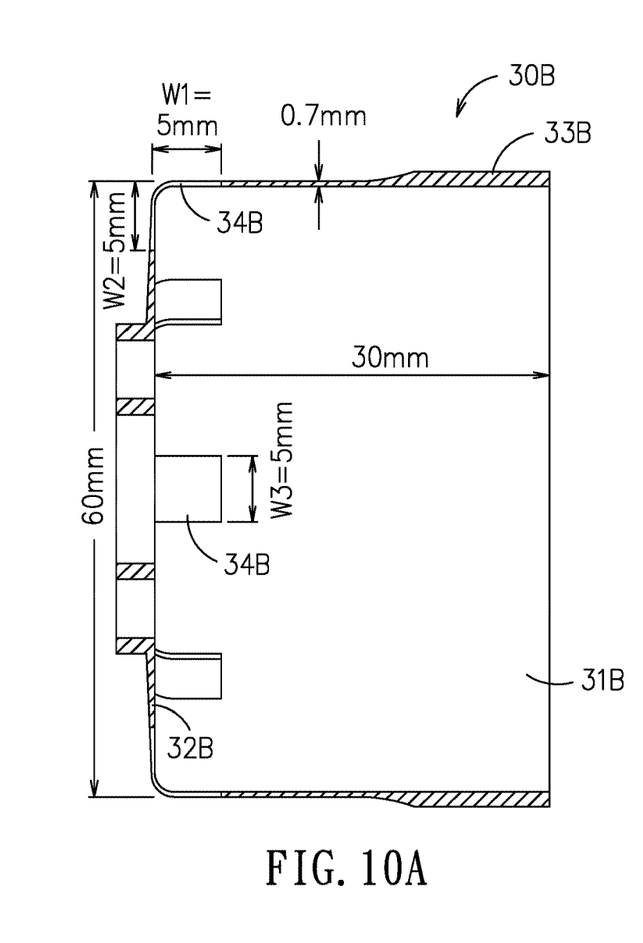
Figure 10B:
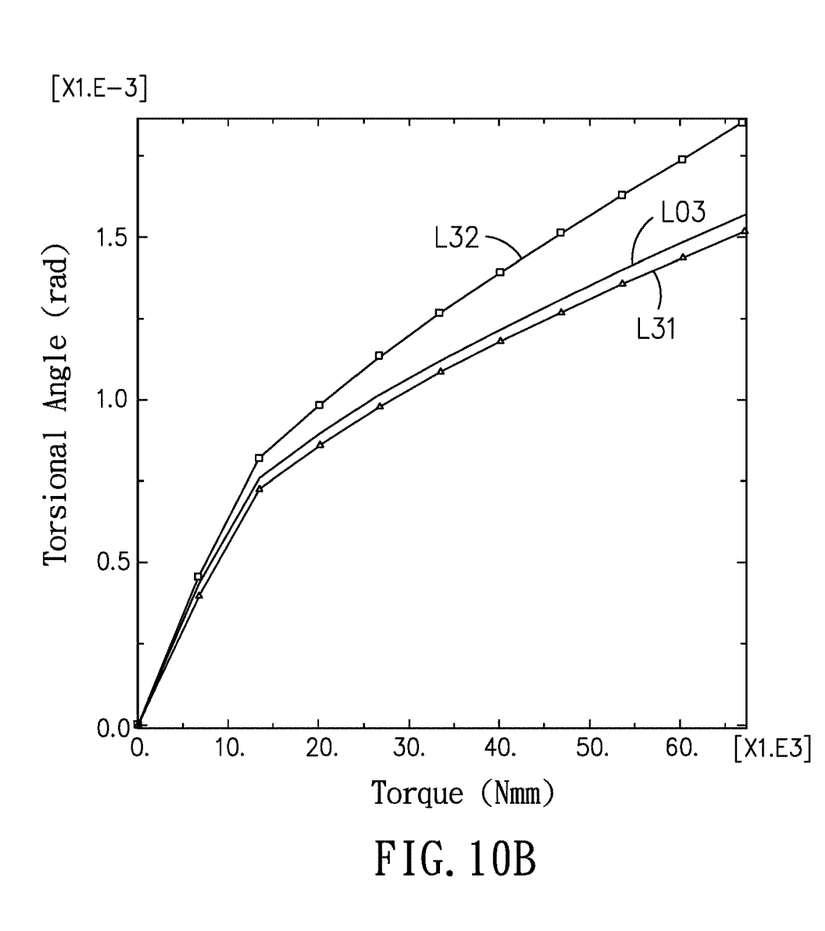

In the FIGS. 8B, 9B and 10B, the curves L01, L02 and L03 are experimental results of conventional flexible wheel designs. In FIG. 11, the main body 91 is furnished with a diameter of 60 mm, an internal depth of 30 mm, a first thickness T1 of 0.4 mm, a second thickness T2 of 0.3 mm, and with a torsional stiffness of $4.27 \times 10^4$ Nm/rad.

In order to measurement the aforesaid torsional stiffness, the wave generator and the rigid wheel are first being fixed while allowing the flexible wheel to be subjected to a varying torque, during the process the input torque and the angle of torsional are measured to be used in a torsional stiffness calculation according to the following equation:

torsional stiffness=torque of the flexible wheel/torsional angle of the flexible wheel.

FIG. 8A shows an embodiment based upon the one shown in FIG. 1, i.e. the flexible wheel 30 is a flexible shallow cup-shaped and is generally composed of a main body 31 and a bottom 32, while allowing an external gear 33 to be furnished and positioned radially around the outside of the main body 31. In this embodiment, the plural holes 34 are circular-shaped holes of 10 mm in diameter, and the main body 31 is furnished with a diameter of 60 mm, a uniform thickness of 0.7 mm, an internal depth of 30 mm. FIG. 8B is a diagram showing the comparisons between conventional flexible wheel designs and the flexible wheel used in an embodiment of the present disclosure. In FIG. 8B, the curve L11 represents an experimental result from the embodiment of FIG. 8A with eight holes 34 that the torsional stiffness of this embodiment of FIG. 8A is $4.34 \times 10^4$ Nm/rad, and the curve L12 represents an experimental result from the embodiment of FIG. 8A with sixteen holes 34 that the torsional stiffness of this embodiment of FIG. 8A is $3.23 \times 10^4$ Nm/rad. Thereby, it is noted that the torsional stiffness of $4.34 \times 10^4$ Nm/rad from the flexible wheel with eight holes of the present disclosure is similar to the torsional stiffness of $4.27 \times 10^4$ Nm/rad from the conventional flexible wheel.

FIG. 9A shows an embodiment based upon the one shown in FIG. 4, i.e. the flexible wheel 30A is a flexible shallow cup-shaped and is generally composed of a main body 31A and a bottom 32A, while allowing an external gear 33A to be furnished and positioned radially around the outside of the main body 31A. In this embodiment, the plural holes 34A of 6 mm in diameter are alternatively disposed on the cup-shaped of the flexible wheel 30A for forming two circles surrounding the flexible wheel 30A. and the main body 31A is furnished with a diameter of 60 mm, a uniform thickness of 0.7 mm, an internal depth of 30 mm. FIG. 9B is a diagram showing the comparisons between conventional flexible wheel designs and the flexible wheel used in an embodiment of the present disclosure. In FIG. 9B, the curve L21 represents an experimental result from the embodiment of FIG. 9A with sixteen holes 34A that the torsional stiffness of this embodiment of FIG. 9A is $4.57 \times 10^4$ Nm/rad, and the curve L22 represents an experimental result from the embodiment of FIG. 9A with thirty-two holes 34A that the torsional stiffness of this embodiment of FIG. 9A is $4.36 \times 10^4$ Nm/rad. Thereby, it is noted that the torsional stiffness of $4.57 \times 10^4$ Nm/rad and $4.36 \times 10^4$ Nm/rad from the flexible wheels with sixteen or thirty-two holes 34A of the present disclosure are similar to the torsional stiffness of $4.27 \times 10^4$ Nm/rad from the conventional flexible wheel design, whereas the flexible wheel with sixteen holes 34A is preferred.

FIG. 10A shows an embodiment based upon the one shown in FIG. 5, i.e. the flexible wheel 30B is a flexible shallow cup-shaped and is generally composed of a main body 31B and a bottom 32B, while allowing an external gear 33B to be furnished and positioned radially around the outside of the main body 31B. In this embodiment, the plural holes 34B are rectangular-shaped holes of 5 mm in width, It is noted that the plural holes 34B can be arranged within an area covering the main body 31B and the bottom 32B, and the main body 31B is furnished with a diameter of 60 mm, a uniform thickness of 0.7 mm, an internal depth of 30 mm. Moreover, the depths W1 and W2 relating to the covering of the main body 31B and the bottom 32B are 5 mm and 5 mm in respective. FIG. 10B is a diagram showing the comparisons between conventional flexible wheel designs and the flexible wheel used in an embodiment of the present disclosure. In FIG. 10B, the curve L31 represents an experimental result from the embodiment of FIG. 10A with eight holes 34B that the torsional stiffness of this embodiment of FIG. 10A is $4.4 \times 10^4$ Nm/rad, and the curve L32 represents an experimental result from the embodiment of FIG. 10A with sixteen holes 34B that the torsional stiffness of this embodiment of FIG. 10A is $3.62 \times 10^4$ Nm/rad. Thereby, it is noted that the torsional stiffness of $4.4 \times 10^4$ Nm/rad from the flexible wheel with eight holes of the present disclosure is similar to the torsional stiffness of $4.27 \times 10^4$ Nm/rad from the conventional flexible wheel design.

To sum up, by the plural holes furnished on the cup-shaped of its flexible wheel and the uniform thickness design on the main body, the harmonic driving device of the present disclosure is designed for allowing its stiffness to be adjusted flexibly, and is able to eliminate vibration and noise while capable of solving the problem of uneven stress distribution on its flexible wheel.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A harmonic driving device, comprising:
   a wave generator;
   a rigid wheel, having an internal gear furnished therein; and
   a flexible wheel, being in cup-shape having an external gear furnished thereon, and further having a main body and a bottom part connected to a first end of the main body, the first end being an end of the flexible wheel closer to the rigid wheel;
   wherein, the cup-shaped flexible wheel further has a plurality of holes furnished thereon, the plural holes allowing for stiffness of the flexible wheel to be adjusted flexibly and for induced stress to be distributed evenly.

2. The harmonic driving device of claim 1, wherein the plural holes are disposed on the cup-shaped of the flexible wheel for forming at least one circle surrounding the periphery of the flexible wheel.

3. The harmonic driving device of claim 1, wherein the plural holes are alternatively disposed on the cup-shaped of the flexible wheel for forming a plurality of circles surrounding the flexible wheel.

4. The harmonic driving device of claim 2, wherein the plural holes are circular-shaped holes.

5. The harmonic driving device of claim 3, wherein the plural holes are circular-shaped holes.

6. The harmonic driving device of claim 1, wherein the plural holes are disposed at the joint between the main body and the bottom within a range covering the main body and the bottom.

7. The harmonic driving device of claim 6, wherein the plural holes are rectangular-shaped holes.

8. The harmonic driving device of claim 1, wherein each of the main body and the bottom is made of a flexible material, and the main body has the first end and a second end that are disposed opposite to each other in a manner that the first end is connected to the bottom while allowing the external gear to be disposed surrounding the periphery of the second end.

9. The harmonic driving device of claim 8, wherein the first end of the main body is furnished with one and the same thickness.

10. The harmonic driving device of claim 9, wherein the thickness of the main body is maintained to be uniform within a range between the first end to the second end.

11. A harmonic driving device, comprising:
    a wave generator;
    a rigid wheel, having an internal gear furnished therein;
    a flexible wheel, being in cup-shape having an external gear furnished thereon, and further having a main body and a bottom part connected to a first end of the main body, the first end being an end of the flexible wheel closer to the rigid wheel;
    a first drive shaft, connected to the wave generator; and
    a second drive shaft, connected to the bottom of the flexible wheel;
    wherein, the rigid wheel is fixedly stationed at a specific position, while allowing one shaft selected from the first drive shaft and the second drive shaft to be used as a power input shaft and the other to be used as a power output shaft; and
    wherein, the cup-shaped flexible wheel further has a plurality of holes furnished thereon, the plural holes allowing for stiffness of the flexible wheel to be adjusted flexibly and for induced stress to be distributed evenly.

12. The harmonic driving device of claim 11, wherein the plural holes are disposed on the cup-shaped of the flexible wheel for forming at least one circle surrounding the periphery of the flexible wheel.

13. The harmonic driving device of claim 11, wherein the plural holes are alternatively disposed on the cup-shaped of the flexible wheel for forming a plurality of circles surrounding the flexible wheel.

14. The harmonic driving device of claim 11, wherein the plural holes are circular-shaped holes.

15. The harmonic driving device of claim 12, wherein the plural holes are circular-shaped holes.

16. The harmonic driving device of claim 13, wherein the plural holes are disposed at the joint between the main body and the bottom within a range covering the main body and the bottom.

17. The harmonic driving device of claim 11, wherein the plural holes are rectangular-shaped holes.

18. The harmonic driving device of claim 11, wherein each of the main body and the bottom is made of a flexible material, and the main body has the first end and a second end that are disposed opposite to each other in a manner that the first end is connected to the bottom while allowing the external gear to be disposed surrounding the periphery of the second end; and the main body is furnished with a thickness while the thickness of the main body is maintained to be uniform within a range between the first end to the second end.

19. The harmonic driving device of claim 18, wherein the first end of the main body is furnished with one and the same thickness.

* * * * *